United States Patent

[11] 3,602,141

| [72] | Inventors | Raymond C. Sutter;<br>Joseph M. Di Phillipo, both of Philadelphia, Pa. |
|---|---|---|
| [21] | Appl. No. | 878,122 |
| [22] | Filed | Nov. 19, 1969 |
| [45] | Patented | Aug. 31, 1971 |
| [73] | Assignee | The United States of America as represented by the Secretary of the Army |

[54] DETONATING SYSTEM
5 Claims, 4 Drawing Figs.

[52] U.S. Cl. .................................................. 102/1, 86/20 C, 102/24 HC, 102/57
[51] Int. Cl. ...................................................... F42b 1/02
[50] Field of Search ........................................ 102/1, 57, 24 HC, 49.5; 86/20.3; 244/1

[56] References Cited
UNITED STATES PATENTS

| 2,866,414 | 12/1958 | Smith | 102/57 X |
| 2,973,164 | 2/1961 | Grill | 102/24 HC X |
| 3,248,072 | 4/1966 | Schimmel | 102/24 HC X |
| 3,374,737 | 3/1968 | Pike | 102/24 HC X |
| 3,444,811 | 5/1969 | Abbott et al. | 102/24 HC X |

*Primary Examiner*—Samuel W. Engle
*Attorneys*—Harry M. Saragovitz, Edward J. Kelly, Herbert Berl and S. Dubroff ABSTRACT: A detonating system for providing an emergency escape exit in an aircraft fuselage or the like, in which a liquid shaped charge tubing is secured in a predetermined manner to a wall for providing a potential escape port therein. The system includes a mixing pump with plural liquid explosive component chambers and a piston responsive to an initiator for expelling a predetermined mixture of the liquid explosive through a nozzle to fill the tubing. A hammer closes the filled tubing when actuated by a 2-second time delay initiator prior to being detonated by a 3-second time delay initiator located in a bypass conduit that interconnects the actuating initiator with the tubing.

INVENTORS
RAYMOND C. SUTTER
JOSEPH M. DIPHILLIPO
BY: Harry M. Saragovitz,
Edward J. Kelly, Herbert Berl &
S. Pubroff    ATTORNEYS:

INVENTORS
RAYMOND C. SUTTER
JOSEPH M. DiPHILLIPO
BY: *Harry M. Saragovitz,*
*Edward J. Kelly, Herbert Berl +*
*S. Dubroff* ATTORNEYS:

DETONATING SYSTEM

The invention described herein may be manufactured, used, and licensed by or for the Government for governmental purposes without the payment to us of any royalty thereon.

The invention relates to a detonation system and, more particularly, to a detonating system for providing an emergency escape exit in an occupant confining wall such as an aircraft fuselage.

Present emergency exit from passenger aircraft is accomplished by the use of doors which are to be unlocked and opened by passengers in event of an on-the-ground emergency where quick exit from the aircraft is desired. However, there is the possibility that the emergency exit doors would become jammed or damaged during a hard landing, thereby preventing a quick exit opening or perhaps making the door opening impossible.

It is an object of the invention to provide a detonation system which would explosively cut and remove an emergency escape hatch in the aircraft fuselage.

Another object of the invention is to provide such a detonation system which is reliable and safe before and during operation.

These and other objects, features and advantages will become apparent from the following description and accompanying drawings in which.

Figure 1:
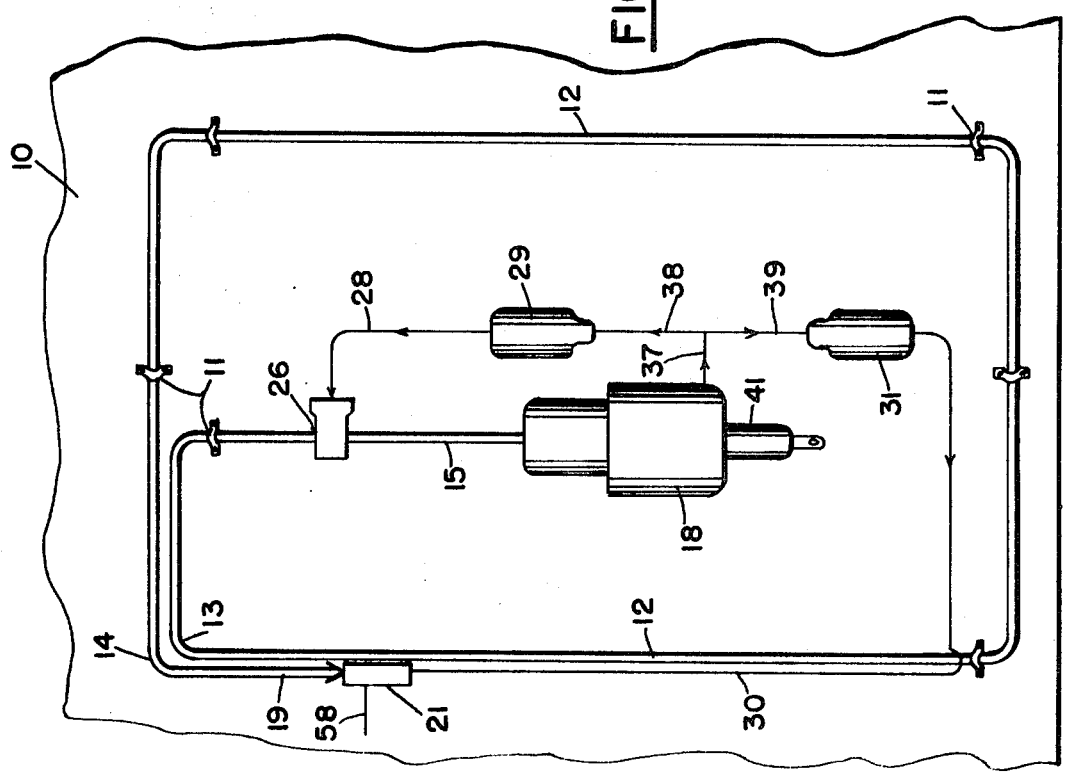
FIG. 1 is substantially a schematic view of a preferred detonation system embodying the principles of the invention.
Figure 2:
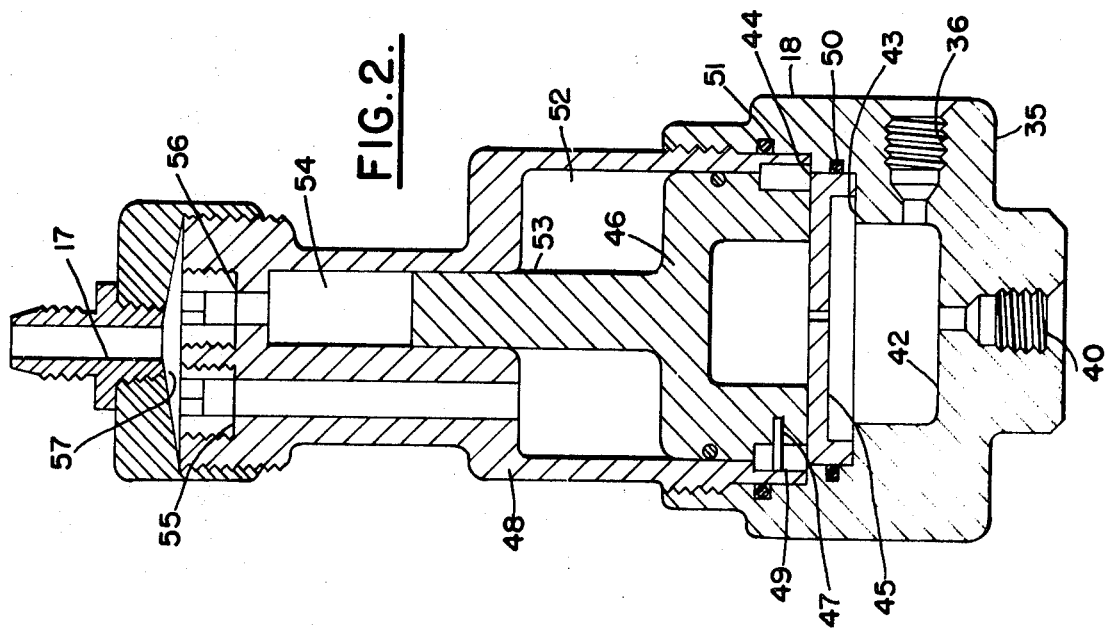
FIG. 2 is a sectional view of the mixing pump assembly used in the FIG. 1 arrangement.
Figure 3:
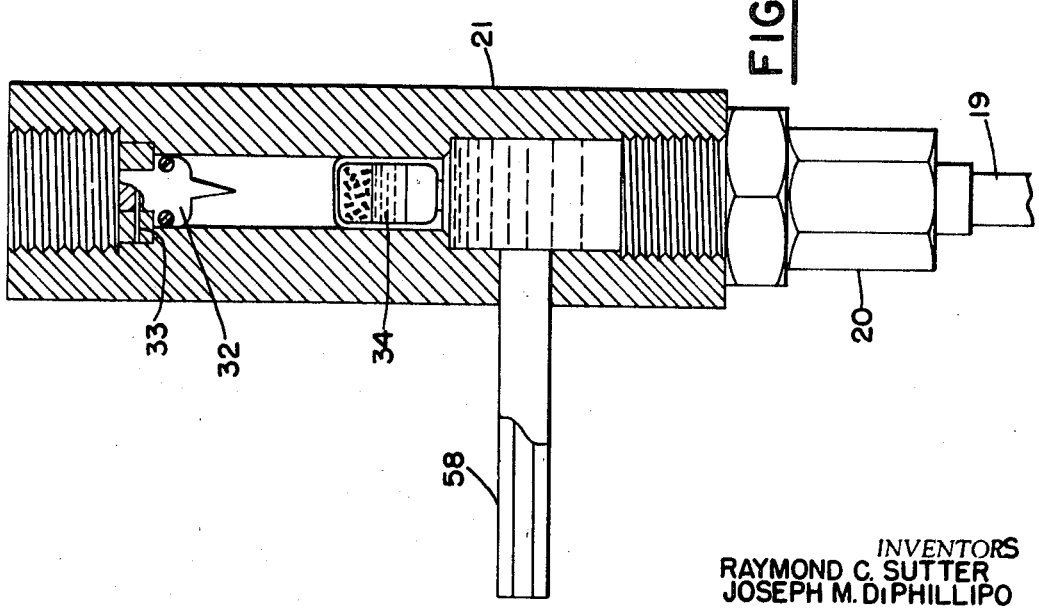
FIG. 3 is a sectional view of the detonator housing assembly of FIG. 1.

Secured to an aircraft fuselage 10 (FIG. 1) or other wall structure in which it is desired that an emergency escape exit be quickly provided, as by appropriate mounting brackets 11 is a predetermined shaped and length of linear aluminum tubing 12 that when filled with a liquid explosive and thereafter detonated will rupture or blow out a rectangular section of the wall 10. The wall section to be explosively cut and removed is defined by the substantially rectangular configuration of the tubing 12 extending between its adjacently positioned 90° bends shown at 13 and 14. The rearward end 15 of the tubing 12 is suitably connected to the outlet port 17 (FIG. 2) of the mixing pump unit or assembly 18, and the shaped tubing forward end 19 is connected by an appropriate fitting 20 to the detonator housing unit or assembly 21 (FIG. 3).

Figure 4:
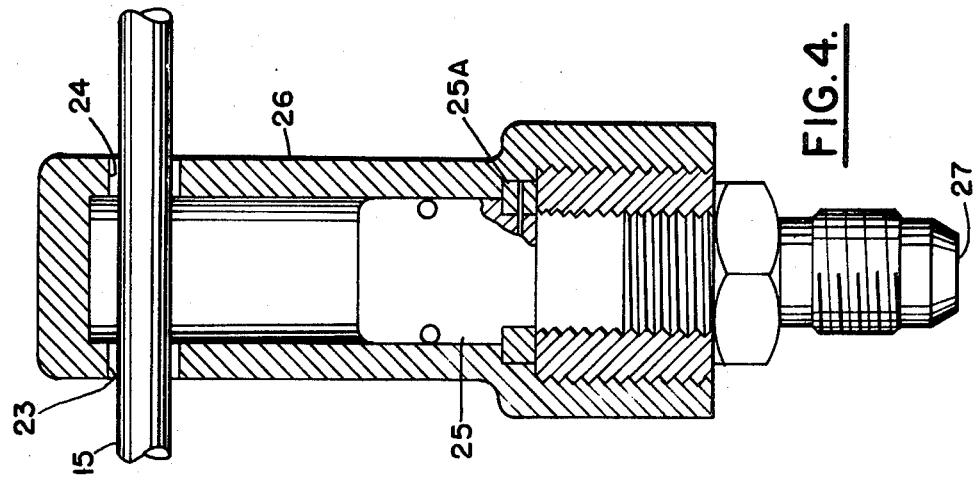
FIG. 4 is a sectional view of the FIG. 1 tube closer assembly.

The tubing rearward end 15 freely passes through diametrically opposed openings 23, 24 (FIG. 4) of a cylindrical wall housing the hammer 27 and its shear pin 25A of tube closer unit assembly 26 whose gas inlet port 27 is fluid communication via conduit 28 (FIG. 1) with a 2-second delay initiator 29. Conduit 30 places a 3-second delay initiator 31 in fluid communication with the firing pin 32 (FIG. 3) that, upon breaking of shear pin 33, strikes detonator 34 to detonate the tubing 12 after it is filled with liquid explosive linear-shaped charge and sealingly flattened or closed by hammer 25.

The mixing pump assembly cap 35 has a lateral gas port 36 which is tapped or threaded for fluid connection via T-shaped conduit means 37, 38, 39 with the corresponding delay initiators 29, 31.

Mixing pump cap 35 has a tapped central port 40 (FIG. 2) by which the actuating initiator 41 (FIG. 1) is secured to the pump unit 18 rearwardly adjacent the cap central recess 42 that has stepped flanges 43, 44 for seating a centrally apertured orifice plate 45 and a recess headed piston 46. Piston 46 is secured initially by shear pin 47 to a ring 49 that is fixed to pump housing 48 when the cap 35 is threadedly secured thereto. Suitable O-rings 50, 51 seal or prevent leakage past the plate 45 and piston housing 48 when the cap 35 is secured.

A liquid containing annular chamber 52 filled with nitromethane surrounds the piston rod 53 which is movable forwardly in a chamber 54 filled with a sensitizer liquid. When the piston 46 is moved by the gas developed by initiator 41, it forces the liquid components to break their seals or blowout discs 55, 56 and enter the mixing chamber 57 from whence the mixed liquid explosive is delivered to fill the tubing 12. Vent tube 58 (FIG. 3) on the detonator housing assembly 21 enables the elimination of air entrapment or bubbles that could interrupt propagation of the fluid explosive.

Upon actuation of the pump initiator 41 by pulling a lanyard (not shown), the mixing pump 18 will automatically mix the nitromethane and sensitizer explosive components (at about a 94:6 volume ratio) and pump the mixed liquid explosive to fill the tubing 12. Pressure gas in the mixing pump will concurrently actuate both the 2-second delay tube closer initiator 29 and the 3-second delay detonator initiator 31, by which the mixing pump, after functioning to purge air from the system, is disconnected from the detonating system immediately before the explosive detonator 34 is fired to propagate a high order detonation in the liquid explosive contained in or filling the shaped tubing 12.

We wish it to be understood that we do not desire to be limited to the exact details of construction shown and described, for obvious modifications will occur to a person skilled in the art.

We claim:

1. In a system for filling and detonating a shaped charge tubing as an explosive line,
    means including a mixing pump in fluid communication with said tubing and having a plurality of chambers each containing a component of a liquid explosive and a liquid compressing piston for delivering predetermined amount of said liquid explosive components to substantially fill said tubing with mixed liquid explosive,
    a first initiator for actuating said piston, and
    a delay initiator responsive to said first initiator and positioned in a bypass conduit for detonating the liquid explosive charge filling said tubing.

2. The structure in accordance with claim 1 wherein a detonator assembly interconnects said tubing sand said bypass conduit.

3. The structure of claim 2 in which said detonator assembly includes a vent tube for exhausting air that may otherwise be trapped in said tubing.

4. The structure of claim 1 wherein a tube closer unit surrounds a portion of said tubing adjacent said nozzle and has a hammer adapted to close said tubing after it has been filled with liquid explosive, and a second delay initiator responsive to said first initiator for actuating said hammer, said second delay initiator being sequentially operative prior to said detonating delay initiator.

5. The structure of claim 4 wherein blowout discs are positioned forwardly of the corresponding liquid explosive component chambers, and a mixing nozzle is positioned intermediate said blowout discs and tube closer unit.